United States Patent
Patt et al.

(10) Patent No.: US 8,066,219 B2
(45) Date of Patent: Nov. 29, 2011

(54) ANHEDRAL TIP BLADES FOR TILTROTOR AIRCRAFT

(75) Inventors: Dan Patt, Lake Forest, CA (US); Abe Karem, N. Tustin, CA (US)

(73) Assignee: Karem Aircraft, Inc., Lake Forest, CA (US)

( * ) Notice: Subject to any disclaimer, the term of this patent is extended or adjusted under 35 U.S.C. 154(b) by 0 days.

(21) Appl. No.: 12/903,928

(22) Filed: Oct. 13, 2010

(65) Prior Publication Data

US 2011/0024552 A1    Feb. 3, 2011

Related U.S. Application Data

(63) Continuation-in-part of application No. 12/429,982, filed on Apr. 24, 2009, now Pat. No. 7,861,967.

(60) Provisional application No. 61/047,844, filed on Apr. 25, 2008.

(51) Int. Cl.
*B64C 15/12*     (2006.01)
*B64C 27/22*     (2006.01)
*B64C 27/467*    (2006.01)

(52) U.S. Cl. ........................ 244/12.4; 244/7 R

(58) Field of Classification Search .................. 244/7 R, 244/7 C, 12.4, 17.11, 17.19, 17.23; 416/223 R, 416/228, 238
See application file for complete search history.

(56) References Cited

U.S. PATENT DOCUMENTS

| | | | |
|---|---|---|---|
| 2,917,255 A * | 12/1959 | Boyd | 244/138 A |
| 3,035,789 A | 5/1962 | Young | |
| 3,106,369 A | 10/1963 | Borst | |
| 3,141,633 A | 7/1964 | MacKay | |
| 3,586,262 A | 6/1971 | Sherman | |
| 4,324,530 A | 4/1982 | Fradenburgh et al. | |
| 4,334,828 A * | 6/1982 | Moffitt | 416/228 |
| 4,668,169 A * | 5/1987 | Perry | 416/223 R |
| 4,975,022 A * | 12/1990 | Perry | 416/228 |
| 5,046,684 A | 9/1991 | Wolkovitch | |
| 5,085,315 A | 2/1992 | Sambell | |
| 5,096,140 A | 3/1992 | Dornier, Jr. et al. | |
| 5,149,014 A * | 9/1992 | Faller | 244/17.19 |
| 5,190,441 A * | 3/1993 | Murphy et al. | 416/129 |
| 5,199,851 A | 4/1993 | Perry et al. | |
| 5,297,759 A * | 3/1994 | Tilbor et al. | 244/17.11 |
| 5,320,494 A * | 6/1994 | Reinfelder et al. | 416/226 |

(Continued)

OTHER PUBLICATIONS

"Jane's All the World's Aircraft"; jawa:janes.com, 2004-2005, pp. 578-581.

(Continued)

*Primary Examiner* — Joshua Michener
*Assistant Examiner* — Joesph W Sanderson
(74) *Attorney, Agent, or Firm* — Fish & Associates, PC

(57) ABSTRACT

A tiltrotor aircraft having a fixed wing and tilting rotors has a rotor blade with a shaped tip portion that provides improved hover performance. The shaped tip portion preferably has a terminal anhedral of at least 20° with respect to its stacking line, and the blade has an overall twist from root to tip of at least 20°, and a thickness ratio between 19% and 30% at a radial station of 10%. These features advantageously conspire to provide a hover figure of merit of at least 0.84 and a cruise propulsive efficiency of at least 0.85. A controller preferably limits the rotor speed in sustained airplane-mode forward flight cruise of at most 40% of a hover maximum rotor speed, and alternatively or additionally limits a rotor edgewise advance ratio to at most 0.20.

6 Claims, 4 Drawing Sheets

U.S. PATENT DOCUMENTS

| | | | |
|---|---|---|---|
| 5,927,948 A | 7/1999 | Perry et al. | |
| 6,116,857 A * | 9/2000 | Splettstoesser et al. | 416/228 |
| 6,142,738 A | 11/2000 | Toulmay | |
| 6,190,132 B1 * | 2/2001 | Yamakawa et al. | 416/228 |
| 6,260,793 B1 | 7/2001 | Balayn et al. | |
| 6,311,106 B1 | 10/2001 | Dupont | |
| 6,328,256 B1 | 12/2001 | Ryan et al. | |
| 6,382,556 B1 * | 5/2002 | Pham | 244/6 |
| 6,607,161 B1 | 8/2003 | Krysinski et al. | |
| 6,641,365 B2 * | 11/2003 | Karem | 416/1 |
| 6,974,105 B2 | 12/2005 | Pham | |
| 7,011,274 B1 * | 3/2006 | Hardoin | 244/17.23 |
| 7,147,182 B1 | 12/2006 | Flanigan | |
| 7,264,200 B2 * | 9/2007 | Bussom et al. | 244/17.25 |
| 7,331,765 B2 * | 2/2008 | Falchero et al. | 416/228 |
| 7,513,750 B2 * | 4/2009 | Moffitt et al. | 416/228 |
| 7,757,992 B2 * | 7/2010 | Bussom et al. | 244/17.25 |
| 2005/0158175 A1 * | 7/2005 | Falchero et al. | 416/223 R |
| 2005/0265850 A1 | 12/2005 | Ota | |
| 2005/0281676 A1 * | 12/2005 | Egolf et al. | 416/228 |
| 2006/0027703 A1 * | 2/2006 | Bussom et al. | 244/17.13 |
| 2009/0148301 A1 * | 6/2009 | Leahy et al. | 416/223 R |
| 2009/0148302 A1 * | 6/2009 | Leahy et al. | 416/224 |
| 2010/0012770 A1 * | 1/2010 | Bussom et al. | 244/17.25 |

OTHER PUBLICATIONS

Acree, C.W. Jr., "Effects of Swept Tips on V-22 Whirl Flutter and Loads", NASA/TM-2005-213458, May 2005, Ames Research Center, Moffett Field, CA, pp. 1-50.

"'V-22' Osprey", Global Security, http://www.globalsecurity.org/military/systems/aircraft/v-22.htm, Feb. 8, 2006, pp. 1-79.

Popelka, D. et al., "Correlation of Test and Analysis for the 1/5-Scale V-22 Aeroelastic Model", Journal of the American Helicopter Society, Apr. 1987, pp. 21-33.

* cited by examiner

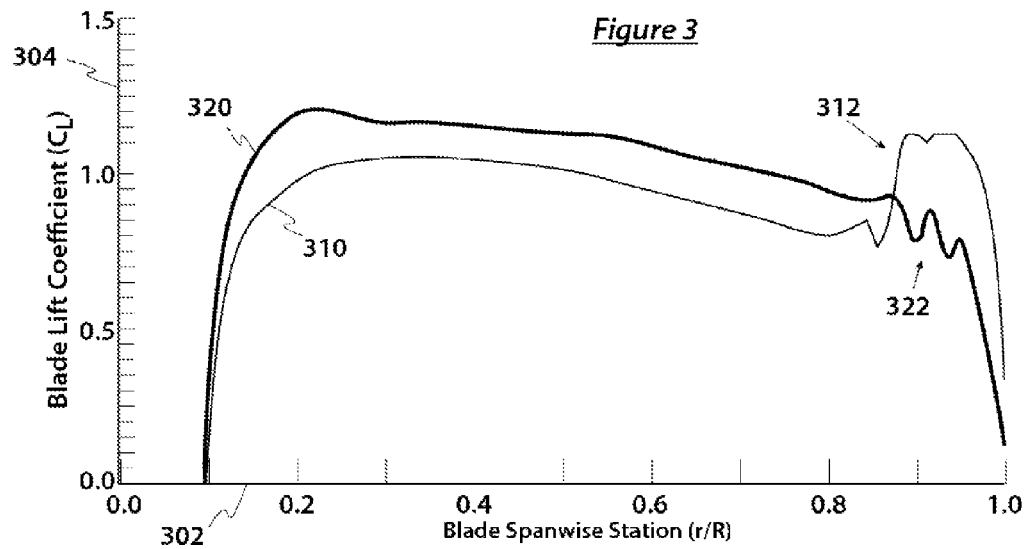
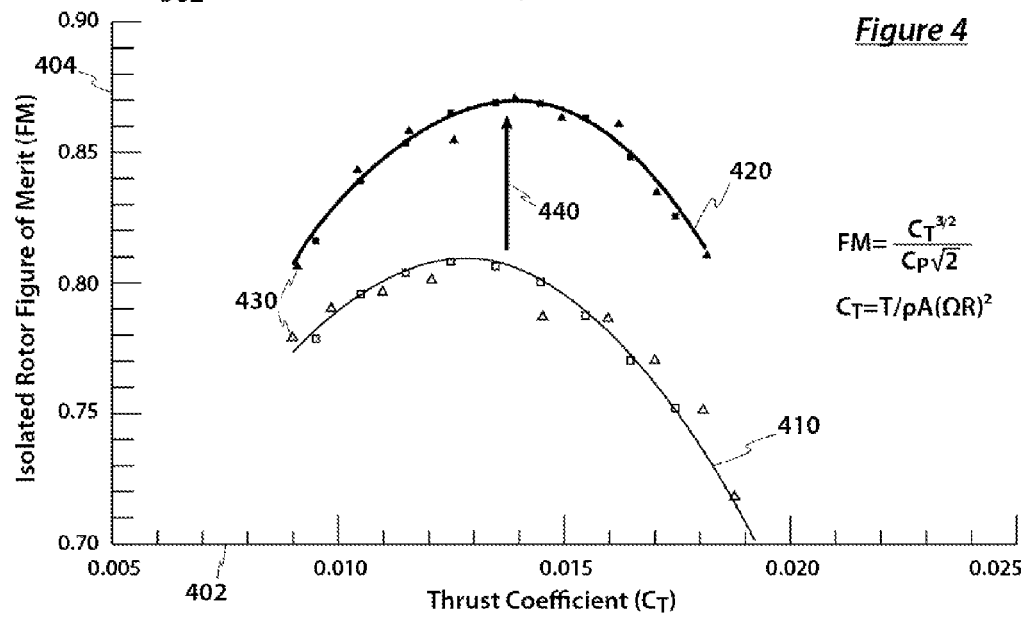

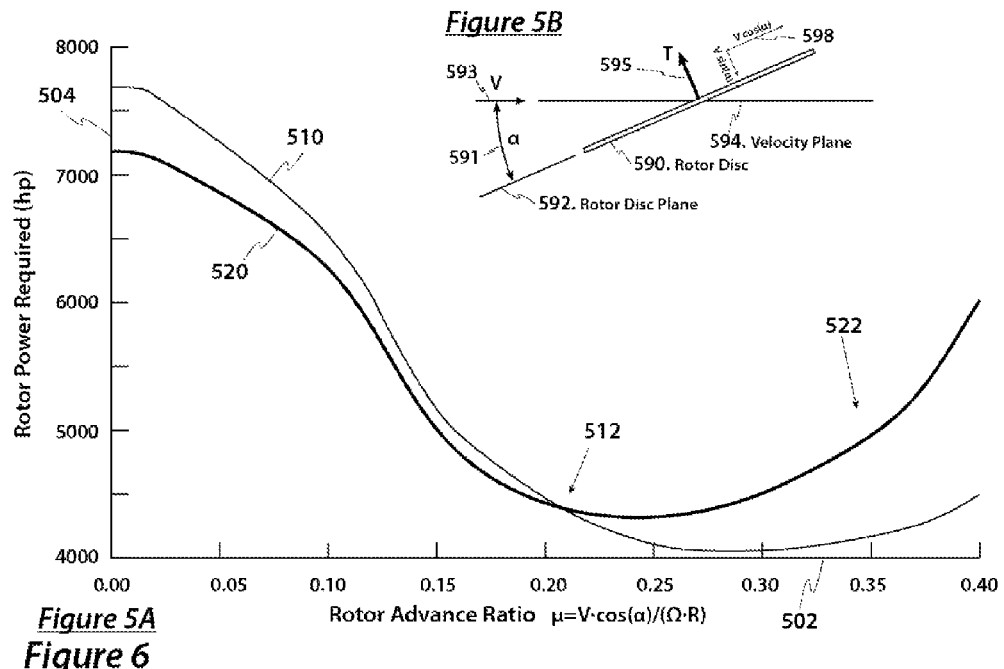
*Figure 5A*
*Figure 5B*
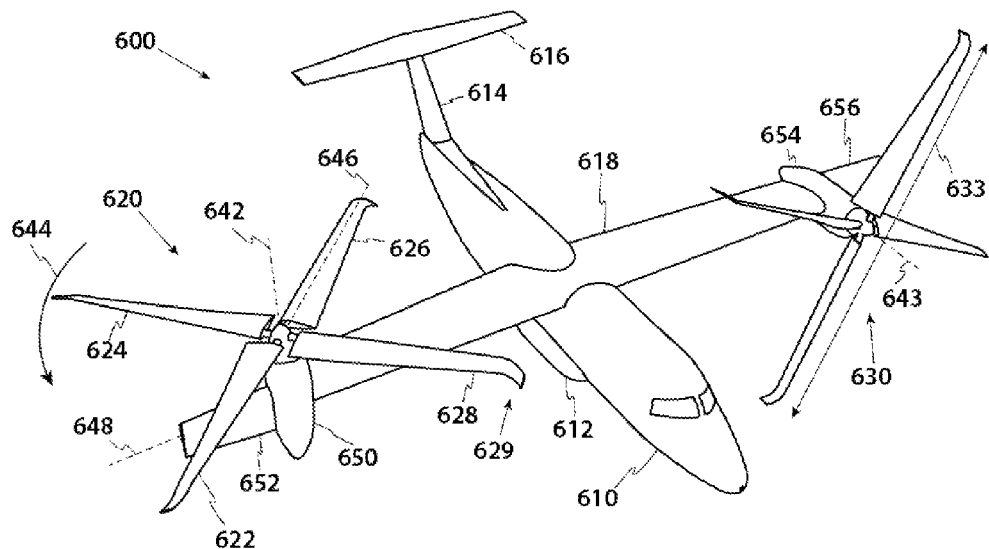
*Figure 6*

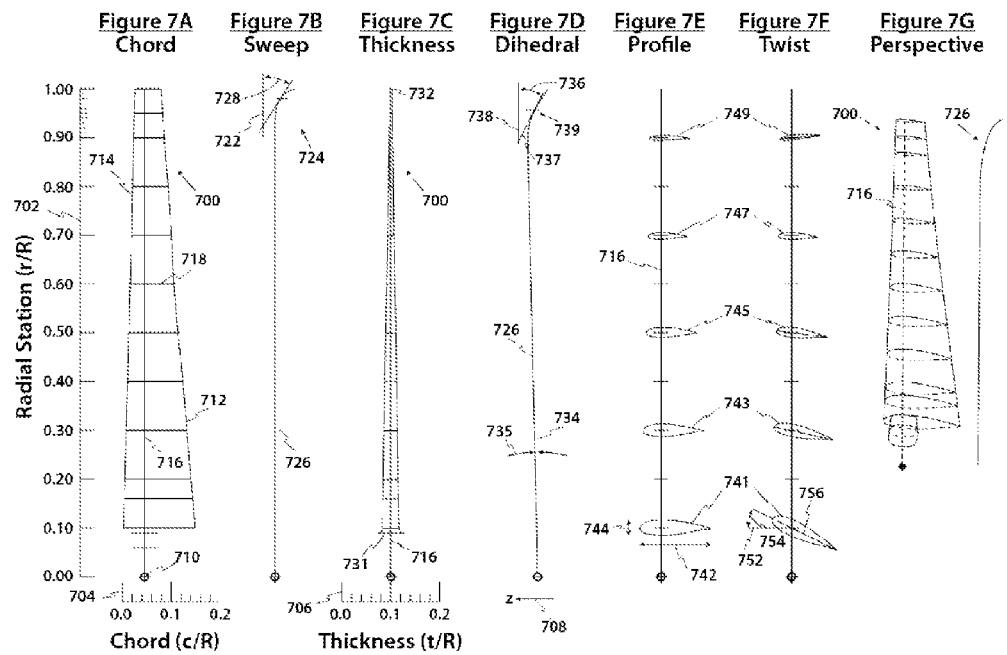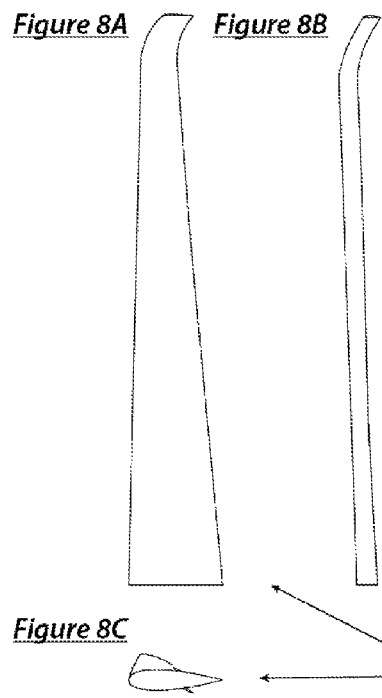

ANHEDRAL TIP BLADES FOR TILTROTOR AIRCRAFT

This application is a continuation-in-part of U.S. patent application Ser. No. 12/429,982 filed Apr. 24, 2009, which claims priority to U.S. Provisional Application 61/047,844 filed Apr. 25, 2008, both which are incorporated by reference herein in their entirety.

FIELD OF THE INVENTION

The field of the invention is rotorcraft rotor blades.

BACKGROUND

Rotorcraft are now a well-established means of transportation, and generally offer a vertical takeoff and landing capability, making them particularly valuable for transport applications without access to lengthy runways. Helicopters are the predominant type of rotorcraft, and have widespread civil and military application. In contrast to fixed-wing aircraft, which use wings to generate sufficient lift to sustain flight, rotorcraft use spinning rotors to generate lift at least in rotor-borne flight.

Rotors comprise blades that can rotate in the air about an axis. As these blades rotate, blade sections encounter an air velocity which is the vector sum of rotorcraft motion, rotor rotation, and air inflow. As a blade section, generally of an airfoil shape, encounters this velocity it produces lift in a direction perpendicular to the velocity vector. Associated with the generation of this circulatory lift is the generation of shed and trailed vorticity into the air. Strong bundles of vorticity are trailed from the tips of the rotor blades, forming a rotor wake. In many flight conditions, the rotor wake can be visualized as a set of intermeshed helices that form from the rotor and gradually decay. This trailed vortex wake can have a strong effect on local rotor blade loads.

The edgewise advance ratio of a rotor is defined as rotor forward velocity divided by rotor tip speed, or $\mu = V \cos(\alpha)/(\Omega R)$. For an ideally hovering rotor, the advance ratio is zero, and the rotor blades trail an un-skewed helical wake below the rotor. As the rotor begins forward motion and advance ratio increases, the wake skews backward. As rotor blades pass near or through trailed vorticity, there is a strong aerodynamic interaction, leading to changes in local blade loading. These changes can lead to reduced performance from increased induced losses, increased vibration, and increased noise. The classical problems of rotor aerodynamics are discussed in the 2006 book "Principles of Helicopter Aerodynamics, 2e" by J. Gordon Leishman.

This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Modern prior art helicopters use specially designed rotor blades to help reduce the adverse effects of interaction between trailed vorticity and blade loading. Some helicopter blades use special tip shapes to modify the vortex trajectory or separate the trailed vorticity into multiple bundles. However, all of the prior art methods have limited effect because dramatic changes in tip geometry will create increased drag and adversely affect performance.

U.S. Pat. No. 5,199,851 to Perry, et al. describes helicopter rotor blades with a tip vane for reducing helicopter blade noise that covers the outer 4 to 8% of the blade and has a dihedral of about five degrees. U.S. Pat. No. 4,324,530 to Fradenburgh, et al. discloses a twisted helicopter blade with the outer 4% of the tip having an anhedral of twenty degrees for improving the rotor performance in hover. US Patent Application 2005/0265850 describes a helicopter rotor blade with a small protruding tip vane that can have an anhedral angle. Similarly, U.S. Pat. No. 6,142,738 to Toulmay describes a helicopter blade with a small tip winglet for reducing noise, the winglet having a leading edge sweep between twenty and thirty degrees.

What these prior art systems and methods have in common is that they all involve relatively minor adjustments to blade tip geometry, both in terms of the percent span affected, and in terms of the amount of anhedral or sweep. There is good reason for this because, for example, excessive anhedral will greatly increase rotor drag in forward flight, negating any benefit of increased hover performance and compromising the utility of the aircraft. Likewise, excessive rotor blade sweep can compromise the vibrational characteristic and aeroelastic stability of the rotor.

In the related field of tiltrotors, rotor blades are generally straight, and do not feature complex tip geometry. As examples of tiltrotors with straight blades, consider the prior art Bell™ V-22, XV-15, and BA-609 tiltrotor aircraft, or U.S. Pat. No. 6,607,161 to Krysinski, which all have straight, tapered blades without tip sweep, tip anhedral, or tip vanes. Because tiltrotors spend much of their flying time in airplane mode with the rotors operating as propellers, there is little need or motivation to create specialized blade tips to alleviate helicopter mode noise, vibration, and performance issues.

Similarly, airplane propellers benefit from tip sweep, but not anhedral or other more complex tip geometries because airplane propellers substantially do not engage in edgewise flight, but remain in predominantly axial flight throughout operation. For propellers, blade-vortex interaction or hover performance are of essentially no concern. U.S. Pat. No. 5,927,948 to Perry, et al. describes a propeller blade with a tip portion of enlarged chord and some sweep, but without any anhedral.

In general, tiltrotors have highly twisted blades and operate at higher thrust coefficients as compared with helicopters. The higher thrust coefficients tend to improve performance in airplane-mode axial flight at the expense of some hover performance. Because tiltrotor aircraft generally hover on takeoff and benefit from ample vertical takeoff capability, there is a continued need for improved tiltrotor hover performance.

Thus, there is still a need for advanced rotors for tiltrotors that can improve hover performance and maintain or improve axial forward flight performance.

SUMMARY OF THE INVENTION

The inventive subject matter provides apparatus, systems and methods in which a shaped-tip portion of a rotor blade provides improved hover performance for tiltrotor aircraft having a fixed wing and tilting rotors.

In preferred embodiments, the blade has a stacking line, and the shaped tip portion of the blade has a terminal anhedral of at least 20°, at least 30° or at least 40° with respect to the stacking line. Also in preferred embodiments, the blade has an overall twist from root to tip of at least 20°, and a thickness ratio between 19% and 30% at a radial station of 10%. These features advantageously conspire to provide that, at an edgewise advance ratio of 0.35, the rotor has a power consumption at least 5% greater than a corresponding rotor without the shaped tip portion.

All suitable rotorcraft are contemplated, including those having hingeless rotor blades, and especially those having stiff and hingeless rotor blades facilitating variable rotor speed.

In another aspect, rotorcraft are contemplated that have a fixed wing of sufficient size to allow wing-borne flight, a rotor with a first blade having a shaped tip portion that provides a hover figure of merit of at least 0.84, at least 0.85, at least 0.86, or at least 0.87 and a cruise propulsive efficiency of at least 0.85, at least 0.86, at least 0.87, or at least 0.88, and a controller that coordinates rotor blade pitch and engine control to achieve variable rotor speed. In those embodiments the controller preferably limits a rotor speed in sustained airplane-mode forward flight cruise of at most 40%, at most 50%, at most 60%, or at most 75% of a hover maximum rotor speed, and alternatively or additionally limits a rotor edgewise advance ratio to at most 0.20, at most 0.25, or at most 0.30.

Unless the context dictates the contrary, all ranges set forth herein should be interpreted as being inclusive of their endpoints, and open-ended ranges should be interpreted to include only commercially practical values. Similarly, all lists of values should be considered as inclusive of intermediate values unless the context indicates the contrary.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 3 is a plot of the blade loading 310 of a blade 110 of rotor 100 compared with the blade loading 320 of blade 210 of rotor 200.

FIG. 4 is a plot of the rotor figure of merit for rotor 100 and preferred rotor 200 over a range of thrusts.

FIG. 5A is a plot of rotor power consumed versus rotor advance ratio for rotor 100 and preferred rotor 200.

FIG. 5B is a diagram illustrating edgewise rotor advance ratio.

FIG. 6 is a perspective illustration of a preferred tiltrotor aircraft

FIG. 7A is a top-view drawing of a rotor blade, while FIG. 7B is a top-view drawing of a preferred blade stacking line. FIG. 7C is a side-view drawing of a rotor blade 700, while FIG. 7D is a side-view drawing of a preferred stacking line. FIG. 7E is a schematic illustration of blade airfoil sections as distributed along the blade stacking line, while FIG. 7F shows the same airfoil sections rotated into place defining the blade twist distribution. FIG. 7G is a perspective illustration of an untwisted straight rotor blade and a preferred stacking line.

FIGS. 8A, 8B, and 8C are top, front, and side-view drawings of a preferred rotor blade 800. FIG. 8D is a perspective view of the same rotor blade 800.

DETAILED DESCRIPTION

The detailed description that follows describes key method and system aspects of the inventive subject matter. It is an object of the following description to show that specially shaped blade tips for tiltrotors can improve hover performance by altering wake trajectory at the expense of reduced edgewise rotor performance.

Figure 1:
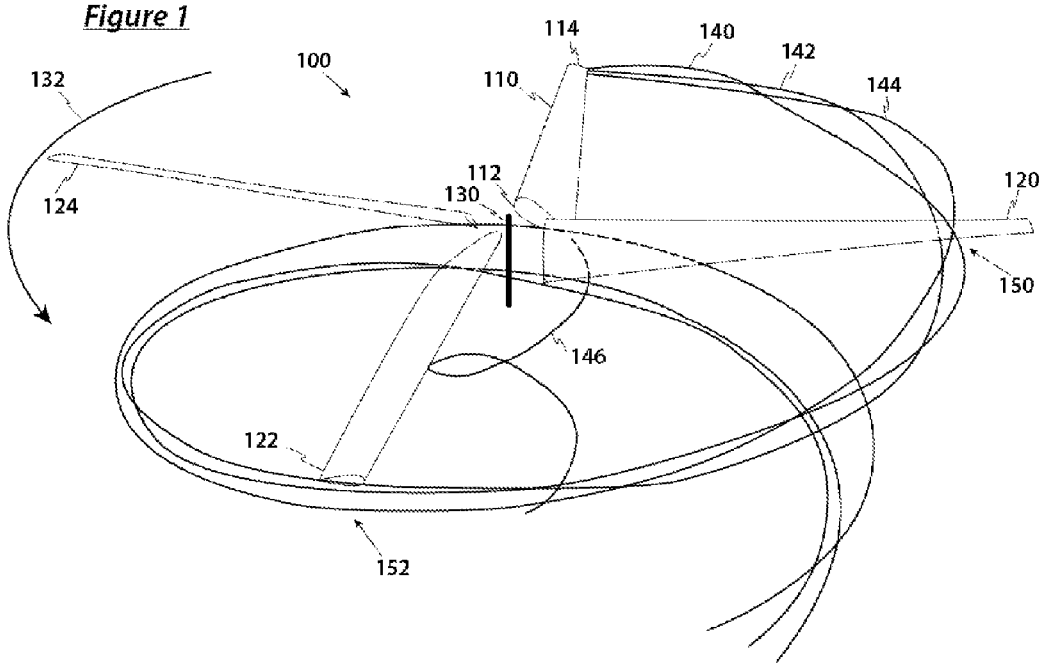
FIG. 1 is a perspective illustration of an isolated rotor in hover with straight blades and conventional blade tips trailing a helical vortex wake.

FIG. 1 is a perspective illustration of an isolated rotor in hover with straight blades and conventional blade tips trailing a helical vortex wake. FIG. 1 is drawn with the aid of the CHARM (Comprehensive Hierarchical Aeromechanics Rotorcraft Model) computer code, produced by Continuum Dynamics, Inc. and described in the 2003 paper "First-Principles Free-Vortex Wake Analysis for Helicopters and Tiltrotors", presented at the Presented at the American Helicopter Society 59th Annual Forum in Phoenix, Ariz. CHARM is generally regarded by the industry as among the leading and most accurate methods for calculating rotor performance and rotor wake structures.

In FIG. 1, a tiltrotor rotor 100 rotates about an axis 130 in the direction indicated by arrow 132. The rotor 100 comprises four rotor blades 110, 120, 122, 124 that are substantially the same and spaced at equal angles around the axis 130. The first rotor blade 110 is substantially straight as defined by a straight stacking line. The blade 110 is highly twisted, with the root section 112 having a higher incidence than the tip section 114. As the rotor blade 110 rotates with the rotor 100 in a hover condition, it encounters a velocity field, generates circulatory lift, and generates vorticity. Further, pressure differences between the upper and lower surfaces of a loaded blade contribute to the formation of a concentrated vortex at the tip of the blade. This behavior can be calculated with a free-vortex wake comprising multiple vortex filaments trailing behind each rotor blade. Rotor blades following the first rotor blade 110 will encounter wake-induced velocity according to the Biot-Savart law. This wake-induced velocity can generate sharp local loading perturbations on rotor blades increasing induced drag, and aggravating noise and vibration of the rotor.

The blades in FIG. 1 are not prior art. They have straight, prior art tip portions, but they also have preferred twist and airfoil distributions that are not known in the prior art.

The first rotor blade 110 trails filaments across its span, but these are especially concentrated towards the blade tip 114, and to a lesser extent, the blade root. In FIG. 1, four strong vortex filaments are depicted, three filaments 140, 142, 144 trailed from the blade tip, and one filament 146 trailed from the blade root. Each filament can be viewed as a contour of constant vorticity. The tip vortex bundle comprising filaments 140, 142, 144 self-interacts as it convects away from the blade 110, and is transported in the velocity field surrounding the rotor. Naturally, each of the following blades 120, 122, 124 also trails vorticity, but for clarity these filaments are not shown in FIG. 1. In a hover condition, the rotor is a substantially periodic system, with each rotor blade undergoing the same loading and trailing the same wake as the blade which preceded it by 90° of azimuth.

The vortex filaments 140, 142, 144 are trailed from the tip 114 of the first rotor blade 110 in a pattern approximating a helix, and pass in close proximity to the second blade 120 in the region indicated by arrow 150. Filament 142 passes below the rotor blade, while filaments 140, 144 pass above the rotor blade. The interaction in the region indicated by arrow 150 generates sharp local loading perturbations on the second rotor blade 120. The tip vortices 140, 142, 144 also affect the loading on subsequent blades including the third blade 122. Arrow 152 indicates where these tip vortices pass near the tip of the third blade 122.

Figure 2:
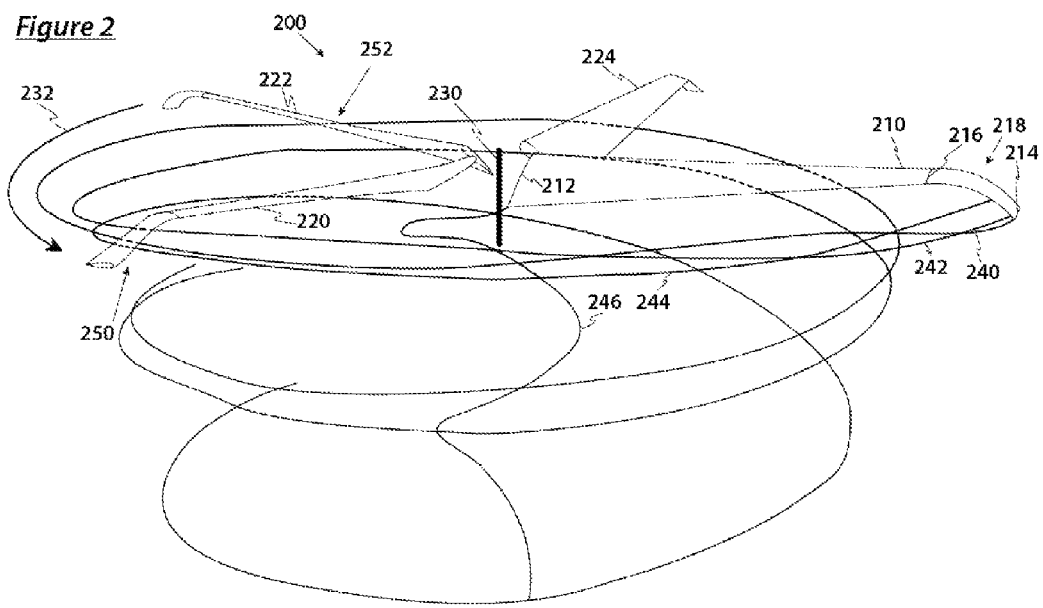
FIG. 2 is a perspective illustration of a preferred rotor 200, operating at the same rotor speed, rotor thrust, and hover condition as the rotor 100 of FIG. 1, and also trailing vortex filaments.

The vortex wake generated by a rotor is largely a function of rotor geometry, rotor thrust coefficient, rotor rotational speed, and flight condition including vehicle forward speed, descent rate, and rotor incidence. In the prior art, helicopter rotors are designed to balance performance in hover and in edgewise forward flight. This will invariably result in compromises in rotor geometry including twist and tip shape, as well as parameters like design rotor speed and design rotor thrust coefficient. The rotors of FIG. 1 and FIG. 2 are isolated rotors in a hover condition. For clarity, the rotors are depicted without the requisite couplings to a rotorcraft airframe.

FIG. 2 is a perspective illustration of a preferred rotor 200, operating at the same rotor speed, rotor thrust, and hover condition as the rotor 100 of FIG. 1, but shown from a different angle. As before, the preferred rotor 200 comprises substantially identical blades 210, 220, 222, 224, and rotates about an axis 230 in the direction indicated by arrow 232. A preferred rotor blade 210 has a shaped tip portion 218 comprising a combination of sweep, anhedral, thickness, and twist. A preferred first blade 210 has an inboard portion that has a substantially straight stacking line, and a shaped tip portion 218 that begins at a spanwise station line 216. The first rotor blade 210 trails vortices 240, 242, 244 from near the blade tip 214, and also a vortex filament 246 from near the blade root 212. The shaped tip portion 218 of the preferred rotor 200 imparts an altered trajectory on the tip vortex filaments 240, 242, 244.

Due to this altered trajectory, the interaction between the tip vortices 240, 242, 244 and the second blade 220 in the region indicated by arrow 250 is reduced. Now, all vortices pass below the second blade, with a substantially increased "miss distance". The "miss distance" is defined as the distance between the closest tip vortex filament trailed from a blade and the blade following the trailing blade. Preferred tip shapes result in a miss distance of a half-chord, or one chord or more, where the chord is measured from the spanwise station line 216. In this instance, and where other upper limits are not expressly stated, the reader should infer a reasonable upper limit. The interaction between the tip vortices 240, 242, 244 and the third blade 222 is also substantially reduced. For the preferred rotor 200, the vortices no longer pass next to the tip of the third blade, now the vortex filaments are substantially lower, and the closest filament 240 passes below the third blade 222 in the region marked by arrow 252.

The different vortex wake structures of rotor 100 and preferred rotor 200 result in different blade loadings. FIG. 3 is a plot of the blade loading 310 of a blade 110 of rotor 100 compared with the blade loading 320 of blade 210 of rotor 200. In this plot, the vertical axis 304 denotes the local blade lift coefficient, while the horizontal axis 302 marks the blade spanwise station. The blade spanwise station is defined as the local radius divided by the tip radius, such that a spanwise station of 1.0 corresponds with the rotor blade tip. A typical rotor blade will not begin at a spanwise station of 0.0 due to blockage from a hub. Due to the nature of circulatory lift, the lift coefficient will drive towards zero at the root and tip of the rotor blade. For minimum induced drag, a smooth profile of blade loading across the span is desired, free of local peaks of discontinuities. In an ideal hover condition, the loadings of all identical blades of a given rotor are expected to be substantially the same.

FIG. 3 presents blade loadings 310, 320 for rotors 100 and 200 respectively, but at substantially the same flight condition comprising rotor thrust, rotor speed, hover condition, and atmospheric condition. The blade loading 310 of rotor 100 shows a strong bubble of concentrated loading towards in the tip region 312, between a spanwise station of 0.8 and 1.0. In contrast, the blade loading 320 of rotor 200 is relatively smooth in the tip region indicated by arrow 322, showing only low-magnitude perturbations. Because the integrated area under the loadings 310, 320 is the same for constant thrust, the blade loading 320 of rotor 200 is somewhat higher inboard, between spanwise stations of 0.15 and 0.8. The preferred rotor 200 is able to achieve enhanced hover performance by reducing the large, wake-induced loading bubble in the tip region 312, thereby reducing the induced drag in that region, and lessening the profile drag for associated blade sections through load alleviation.

FIG. 4 is a plot of the rotor figure of merit for rotor 100 and preferred rotor 200 over a range of thrusts. The rotor figure of merit is denoted FM, and is a non-dimensional measure of rotor efficiency, and defined in FIG. 4. The thrust coefficient, CT, is a non-dimensional measure of rotor thrust or rotor loading, defined in FIG. 4 as the rotor thrust divided by the product of air density, rotor area, and the square of the product of rotor rotational speed and radius. For the plot of FIG. 4, the vertical axis measures isolated rotor figure of merit, while the horizontal axis 402 measures thrust coefficient. Higher figures of merit are better, indicative of greater rotor efficiency. A modern, well-designed prior art rotor can achieve a figure of merit near 0.80. Increased disc loading can also result in slightly higher figure of merit.

In FIG. 4, faired curve 410 denotes the figure of merit for rotor 100 as a function of thrust coefficient. Rotor 100 reaches a peak efficiency of around FM=0.81 near a thrust coefficient of 0.013. Symbols 430 denote data used to generate faired curves 410, 420. Faired curve 420 marks the figure of merit for preferred rotor 200 with specially shaped blade tip sections. Preferred rotor 200 reaches a peak efficiency of around FM=0.87 near a thrust coefficient of 0.014. Arrow 440 indicates an increase of around 0.06 in rotor figure of merit, an approximately 7% increase in figure of merit over the straight rotor 100.

FIG. 4 demonstrates that a rotor according to the teachings herein can achieve a substantial hover performance advantage as compared to prior art rotors. This is due to the smoother, more optimal loading distribution as illustrated in FIG. 3. The improved loading distribution is a result of an advantageously altered wake trajectory, as shown in FIG. 2. Specially shaped rotor blade tip portions according to teachings herein can achieve such desirable wake trajectories.

As previously mentioned, most rotorcraft rotor designs are a compromise between hover performance and edgewise forward flight performance. While the specially shaped rotor blade tip portions according to teachings herein are shown to improve hover performance, this does not imply an associated improvement in edgewise forward flight performance. For most applications, edgewise forward flight performance of a rotor is more important than hover performance. For transport applications, most helicopters must carry passengers or other cargo from one location to another with some vehicle forward speed. For economical operation, edgewise rotor efficiency at this vehicle forward speed is very important. Even prior art tiltrotors, including the Bell V-22, perform many operations with edgewise rotors, at advance ratios of up to 0.30.

FIG. 5A is a plot of rotor power consumed versus rotor advance ratio for rotor 100 and preferred rotor 200. FIG. 5B is a diagram illustrating edgewise rotor advance ratio. In FIG. 5B, a rotor disc 590 is depicted from a side view. The rotor disc 590 is advancing forward (to the left in FIG. 5B) such that it is met by an oncoming velocity 593. In order to achieve trimmed flight, balancing vehicle weight and drag, the rotor disc 590 is oriented at an angle with respect to the velocity 593. From this side aspect, an angle $\alpha$ defines the orientation between the velocity plane 594 and the rotor disc plane 592. The rotor disc is defined as the disc containing the spinning rotor blades, and produces a thrust 595. The velocity 593 can be expressed in a perpendicular velocity component and an edgewise velocity component 598. The non-dimensional rotor advance ratio, $\mu$, is defined as the edgewise velocity component 598, $V \cos(\alpha)$ divided by the product of rotor rotational speed and rotor radius. It can be viewed as the ratio between edgewise velocity and rotor tip speed.

In the plot of FIG. 5A, the horizontal axis 502 measures edgewise rotor advance ratio, while the vertical axis 504 measures rotor power consumed in horsepower. Curve 510 characterizes the rotor 100 performance as a function of forward speed or advance ratio, and is known as a "power bucket" in the industry vernacular because of its distinctive bucket shape. Curve 520 is the power bucket for preferred rotor 200. In a hover condition, corresponding to an advance ratio of 0.00 at the left side of the plot, the preferred rotor 200 is seen to consume approximately 7% less power than the straight rotor 100, show by comparison of curves 510, 520. A performance advantage of the preferred rotor 200 persists at low forward speeds, corresponding to advance ratios of about 0.10. At an advance ratio of 0.20, a crossover 512 occurs, after which the straight rotor 100 consumes less power, and is more efficient than the preferred rotor. In the region between advance ratios of 0.30 and 0.40, where most rotorcraft cruise, the straight rotor consumes between 10 and 30% less power.

Thus, the preferred rotor 200 has poor performance in edgewise flight. The preferred rotor 200 uses special tip sections 218 to alter wake trajectories for improve loading distributions in hover indicated by arrow 322. However, as the rotor moves in edgewise flight, the forward velocity 593 of the vehicle alters the wake trajectory itself, gradually reducing or eliminating the advantage of the special tip section 218. At higher edgewise rotor speeds, corresponding to advance ratios above about 0.20, the special tip section 218 begins to act as a blockage in the flow, and has increased drag as compared to the relatively more streamlined straight tips of rotor 100.

A person of ordinary skill in the art would not contemplate using a rotor with such tips because this type of rotor would have substantial deleterious consequences on the cruise performance of a vehicle and rotor. As stated before, most prior art helicopters cruise at advance ratios of between 0.30 and 0.40 or more, and even prior art tiltrotors fly at edgewise advance ratios of 0.30. An engineer would simply not choose a design that significantly reduced vehicle performance in arguably the most important flight condition, high speed edgewise rotor cruise.

Difference between prior art rotor blade tips and the preferred tip section 218 include the degree of anhedral in the preferred blade 210, and the particular combination of sweep, anhedral, twist, and thickness. These are quantified below. Prior art rotor blade tips had only comparatively moderate amounts of anhedral over a modest portion of the blade, because a more dramatic blade tip would compromise rotor edgewise performance.

The rotor 100 and preferred rotor 200 both have a rotor diameter of 53 feet. Other contemplated rotors have diameters between 10 and 120 feet, or more preferably between 25 and 90 feet, and specifically contemplated diameters of 15, 20, 25, 26, 36, 40, 56, 65, 75, 80, and 90 feet. Diameters are measured as projected diameters in a flat plane. In FIG. 1 through FIG. 5, rotor performance and aerodynamic behavior was computed using a combination of CDI CHARM and CAMRAD II as distributed by Analytical Mechanics, Inc.

FIG. 1, FIG. 2, FIG. 3, and FIG. 5 correspond to a 53 foot diameter rotor turning at a rotational speed of 290 revolutions per minute (RPM), operating at a thrust coefficient of 0.0155 at sea level with an ambient temperature of 103 degrees Fahrenheit. This corresponds and a thrust of around 48,500 pounds per rotor. FIG. 4 corresponds to a range of thrusts, a tip Mach of about 0.74, and a rotational speed of 310 RPM.

The calculations performed and presented in FIG. 1 through FIG. 5 are considered to be representative of performance for similar rotors and typical operating conditions. The Applicants have performed similar studies on other rotor sizes, over a range of variable rotor speeds, and at other atmospheric, loading, and flight conditions, and significant improvements hold true using the inventive subject matter.

FIG. 6 is a perspective illustration of a preferred tiltrotor aircraft 600 equipped with 25-foot diameter rotors according to the teachings herein. The aircraft 600 comprises a fuselage 610, sponsons 612 containing landing gear, a vertical tail 614, and a horizontal tail 616. A controller (not shown) coordinates many aspects of the aircraft operations, and directs movable surfaces on the tails 614, 616 to cooperate with the rotors 620, 630 for control of aircraft 600 in flight.

A main wing 618 extends across the fuselage 610 of the aircraft 600 and provides lift in forward cruise flight in airplane mode. The main wing 618 supports a right tilting nacelle 650 and a left tilting nacelle 654. The right nacelle 650, rotor 620, and outer wing 652 are shown configured for helicopter-mode flight. The left nacelle 654, rotor 630, and outer wing 656 are shown configured for airplane-mode cruise flight. In normal operation, the left and right nacelles 650, 654 are always aligned.

The right tilting nacelle 650 is carried by wing 618, and tilts about an axis 648 between a vertical, helicopter-mode of operation and a horizontal, airplane-mode of operation. The right rotor 620 comprises rotor blades 622, 624, 626, 628 coupled to a hub. The nacelle 650 advantageously comprises a means of propulsion such as an engine and gearbox coupled to the hub and rotor 620. A rotor blade 626 is configured to pitch or feather about a feather axis 646. Considerable pitch variation capability of a rotor blade 626 allows transition between helicopter-mode and airplane-mode, at least 50°, 60°, 70°, 80°, 90°, or even 110°. The outer wing 652 is coupled to nacelle 650 and rotates with it. The rotor rotates about an axis 642, and has a maximum allowable rotor speed. Rotor pitch and speed are regulated with the assistance of a controller. In airplane-mode cruise, the aircraft 600 is capable of sustained operation with both rotors at a rotational speed that is less than 75%, 60%, 50%, or 40% of the maximum allowable rotor speed.

The aircraft 600 is equipped with preferred rotors according to the teachings herein, capable of achieving a peak hover figure of merit of 0.83, 0.84, 0.85, or even 0.87 when the rotors 620, 630 are oriented in helicopter mode with rotor axes 642, 643 substantially in a vertical orientation. The same rotors 620, 630 are capable of achieving a cruise propulsive efficiency of 0.84, 0.85, 0.86, 0.87, 0.88, or even 0.89 in airplane mode when the rotor axes 642, 643 are substantially horizontal and the aircraft is cruising at a Mach number of 0.45, 0.5, 0.55, or 0.6. This high cruise propulsive efficiency is partially due to the reduction of rotor rotational speed. The aircraft 600 has a rotor 630 with a fixed diameter 633 of 25 feet. All practical rotor or prop-rotor sizes are contemplated, and variable diameter rotors are also contemplated. Any practical number of blades is considered, including 2, 3, 4, 5, and 6 blades per rotor, although a rotor of four blades is especially preferred.

As shown in FIG. 6, a preferred rotor 620 comprises a rotor blade 628 having a shaped tip portion 629. The rotor blade 628 has a straight stacking line over at least 70% or 80% of its length, but less than 90% or 95% of its length. The rotor blade 628 is advantageously given a dihedral of at least 1°, 2°, 2.5°, 3°, or 5°. The tip portion 629 has a terminal anhedral of at least 20°, 25°, 30°, 35°, or 40° with respect to the stacking line including dihedral. The tip portion 629 also has a terminal sweep of at least 15°, 20°, 22°, 25°, or even 30°. The rotor blade has an overall twist from root to tip of at least 20°, 25°, 28°, 30°, 32°, 35, or even 37°. As used herein the terms "terminal anhedral" and "terminal sweep" refer to the terminal 1% of blade span. The blade geometric parameters described in this specification refer to the jig shape, i.e., the manufactured shape without elastic deflection.

FIG. 7A is a top-view drawing of a rotor blade 700, while FIG. 7B is a top-view drawing of a preferred blade stacking line 726. FIG. 7C is a side-view drawing of a rotor blade 700, while FIG. 7D is a side-view drawing of a preferred stacking line 726. FIGS. 7A-7D are drawn to scale with respect to each other. FIG. 7E is a schematic illustration of blade airfoil sections as distributed along the blade stacking line 716, while FIG. 7F shows the same airfoil sections rotated into place defining the blade twist distribution. FIG. 7G is a perspective illustration of an untwisted straight rotor blade and a preferred stacking line 766.

The sequence of FIGS. 7A-7D assists in defining blade geometry and blade shapes as relevant to the inventive subject matter. A vertical axis 702 measures the blade spanwise position or radial station along the blade for FIGS. 7A-7F. A radial station of 1.0 corresponds with the blade tip, while a radial station of 0.0 corresponds with the rotor center of rotation 710. The root of a typical blade starts at a radial station of about 0.10. FIG. 7A has a horizontal axis 704 measuring chord, while FIG. 7C has a horizontal axis measuring thickness. The straight, untwisted reference blade 700 is shown to have tapering chords from the blade root to the blade tip corresponding to a taper ratio of approximately 0.375. For an untwisted blade, the chord of an airfoil section 718 extends between a trailing edge 712 and leading edge. The blade geometry can be viewed as a continuous loft between blade sections. A preferred blade has the same airfoils and chord distribution as reference blade 700, but a different, non-straight stacking line 726. The stacking line 716 of the reference blade 700 is a straight line extending radially outward from the center of rotation 710. From a top view, the stacking line 726 of a preferred blade 800 is straight over a substantial portion of the blade, corresponding to a radial station of 0.6, 0.7, 0.8, 0.9, 0.93, or 0.95. On preferred blades, airfoils are aligned onto the stacking line 726 in the streamwise or tangential direction at a 20%, 30%, 35%, or 40% of the airfoil section chord. The airfoils are rotated about this same point to establish a twist. At a given radial station, the instantaneous sweep is the sweep angle 728 of the stacking line 726 as measured against a straight line 722.

FIG. 7C is a side view of an untwisted reference blade 700 with a straight stacking line. A blade cuff 731 serves to couple the blade root to a rotor hub. Both the thickness ratio and chord change along the rotor span, resulting in a tapering blade thickness as shown in FIG. 7C. FIG. 7D is a side view of a preferred stacking line 726 showing an anhedral tip. The preferred stacking line has a precone angle 735 of 2.5°, defined as the angle between the base portion of the stacking line and a straight radial line 734. In FIGS. 7C and 7D, arrow 708 indicates the upwards thrust direction. At a given radial station, the instantaneous dihedral or anhedral at a point 739 along the stacking line 726 is the dihedral angle 736 of a tangent 737 to the stacking line 726 as measured against a straight line 738. The terminal sweep is the sweep at the tip of the blade. Anhedral is negative dihedral, a downwardly bent portion of the blade tip. Blade anhedral will begin at a spanwise station line.

FIG. 7E is an illustration of airfoil sections or rotor blade cross sections superimposed on a straight reference stacking line 716. A blade may be defined by any number of airfoils or cross-sections, for example, 1, 2, 4, 6, 8, 10, 12, 16, 20, 24, 30, 40, 50, or more. A given airfoil section 741 has a maximum thickness indicated by arrow 744 and a chord indicated by arrow 742, such that the section has a thickness to chord ratio. The reference blade is defined by a 10% radial station airfoil section 741, a 30% radial section airfoil section 743, a 50% radial section airfoil section 745, a 70% radial station airfoil section 747, and a 90% radial station airfoil section. FIG. 7F is an illustration of how the airfoil sections are rotated about the stacking line to the section twist angle. An airfoil 741 has a reference line 756 that runs from the leading edge to the trailing edge of the airfoil 741. The section twist angle 754 is angle that this section is rotated nose up from a horizontal reference plane 752. In general, root sections are twisted nose up while tip sections are rotated nose down to account for inflow and velocity gradients along the span. For convenience, the rotor section at 75% span is often defined to have zero twist. The overall blade twist is the difference between the root twist and tip twist.

FIG. 7G is a perspective drawing of an untwisted straight reference blade 700 having a straight stacking line 716. A preferred stacking line 726 is also shown, having an advantageous combination of anhedral and sweep. A preferred blade 800 comprises the airfoils of the reference blade stacked along a preferred stacking line and twisted.

The table below summarizes the parameters characterizing preferred and especially preferred rotor blades and blade tip sections according to the teachings herein.

| Radial Station (r/R) | Twist (especially preferred) | Twist Range (preferred) | Sweep (especially preferred) | Sweep Range (preferred) | Anhedral (especially preferred) | Anhedral Range (preferred) |
| --- | --- | --- | --- | --- | --- | --- |
| 0.09 | 20.8 | 12.5-27.1 | 0 | 0 | −2.5 | 0--6 |
| 0.20 | 16.1 | 9.7-21.0 | 0 | 0 | −2.5 | 0--6 |
| 0.30 | 12.9 | 7.7-16.7 | 0 | 0 | −2.5 | 0--6 |
| 0.40 | 9.7 | 5.8-12.6 | 0 | 0 | −2.5 | 0--6 |
| 0.50 | 7.2 | 4.3-9.3 | 0 | 0 | −2.5 | 0--6 |
| 0.60 | 4.8 | 2.9-6.2 | 0 | 0 | −2.5 | 0--6 |
| 0.70 | 1.6 | 1.0-2.1 | 0 | 0 | −2.5 | 0--6 |
| 0.75 | 0 | 0.0-0.0 | 0 | −10-30 | −2.5 | −6-30 |
| 0.80 | −1.6 | −1.0--2.1 | 0 | −10-30 | −2.5 | −6-30 |
| 0.85 | −3.3 | −2.0--4.2 | 0 | −5-30 | −2.5 | −6-30 |
| 0.90 | −4.9 | −2.9--6.4 | 0 | −5-30 | −2.5 | −6-30 |
| 0.93 | −5.4 | −3.2--7.0 | 0 | 0-30 | 12.5 | −6-30 |
| 0.96 | −6.1 | −3.7--8.0 | 12.5 | 15-35 | 22.5 | 15-35 |

-continued

| Radial Station (r/R) | Twist (especially preferred) | Twist Range (preferred) | Sweep (especially preferred) | Sweep Range (preferred) | Anhedral (especially preferred) | Anhedral Range (preferred) |
|---|---|---|---|---|---|---|
| 0.98 | −6.9 | −4.1−−8.9 | 24.81 | 20-40 | 27.5 | 20-40 |
| 1.00 | −7.6 | −4.6−−9.9 | 34.73 | 25-45 | 32.5 | 25-45 |

An especially preferred blade has chord, expressed as c/R, of 6.9% at a 20% radial station, of 5.2% at a 50% radial station, of 3.9% at an 80% radial station, of 3.3% at a 90% radial station, and 2.8% at 100% radial station. An especially preferred blade has thickness ratios of 22.5% at a radial station of 10%, of 21.5% at a radial station of 30%, of 20% at a radial station of 50%, of 15.4% at a radial station of 70%, and of 11.4% at a radial station of 90%. Preferred blades have thickness ratios between 19% and 30% at a radial station of 10%, thickness ratios between 18% and 23% at a radial station of 30%, and thickness ratios between 8% and 14% at a radial station of 90%, with a tip section having a thickness ratio of less than 11%.

FIGS. 8A, 8B, and 8C are a top, front, and side-view drawings of a preferred rotor blade 800. FIG. 8D is a perspective view of the same rotor blade 800. FIGS. 8A, 8B, and 8C are to scale.

An especially preferred aircraft for application of the preferred rotor is the AeroTrain™ tiltrotor as disclosed in provisional application Ser. No. 61/047,844, which is compatible with 53-foot or 56-foot diameter rotors according to the teachings herein. Equipped with preferred blades and a suitable controller, the AeroTrain would be configured to avoid flight beyond an edgewise advance ratio of 0.25, thereby avoiding substantial performance penalties from the preferred blades.

Preferred blades use combinations of relatively high tip droop (anhedral) and relatively high sweep at the very outboard portion of the blade tip. In especially preferred embodiments, it is contemplated that the amount of tip anhedral will be sufficient to reduce edgewise rotor performance by 5% or even 10% at advance ratios above 0.30 as compared with a straight rotor.

Preferred rotors have a blade tip shape that alters the hover tip vortex trajectory using a combination of tip droop, sweep, and other geometric modifications. Prior art helicopters do not use the large anhedral necessary to significantly alter vortex trajectories, more than 25 degrees, because of the associated reduction in rotor-borne edgewise flight efficiency. An especially preferred tip shape has a droop angle at the tip of the blade (i.e., terminal anhedral) of 33 degrees combined with a tip sweep angle (i.e., terminal sweep) of 35 degrees, which gradually washes out over the outboard 10% of the blade.

Viewed from a performance aspect, a rotor according to teachings herein could reduce the power required to hover by 7% or more. It is contemplated that this would be particularly advantageous in the case of failure of one or more engines of a rotorcraft. If one engine is inoperative, a rotorcraft with the especially preferred blade tip shape using 7% less power than a straight blade could hover with 5% more weight. Thus, it is contemplated that this aspect of the inventive subject matter also has rotorcraft safety benefits.

Method aspects of the inventive subject matter are contemplated wherein computer simulation is used to predict the performance of a rotorcraft rotor. The computer simulation could use blade element theory to compute blade section performance in strips, or it could consist of grid-based solution of the coupled Navier-Stokes fluid flow equations. It is further contemplated that the rotor shape could be parametrically described. Such computer performance predictions could be coupled to a numerical optimization program, and configured to run in a closed-loop manner such that blade geometry would be automatically iterated to improve the blade performance by increasing the hover figure of merit and cruise propulsion efficiency. It is further contemplated that rotor airfoil shapes could also be modified in a similar closed-loop manner.

The AeroTrain is designed for a cruise capability of Mach 0.65, using the same prop-rotors for propulsion. A key challenge in tiltrotor rotor design is balancing hover performance with cruise axial flow performance. The AeroTrain achieves this balance by reducing rotor speed in sustained airplane-mode forward flight cruise to 75%, 65%, 50%, 40%, or even 30% of a hover maximum rotor speed.

This is achieved through the use of stiff, hingeless rotor blades designed to avoid aeroelastic instability or adverse vibration as described in priority patent application Ser. No. 12/429,982. Preferred rotors are coupled to a gearbox with one, two, or more output ratios and a turbine engine with a variable speed free power turbine. The aircraft comprises a controller that coordinates rotor blade pitch and engine control to achieve variable rotor speed.

At these reduced rotor rotational speeds, the twist distribution of rotor. Simulations indicate that the same rotor tip design that improves hover performance by 7% as compared with a straight rotor results in a small cruise efficiency improvement of about 0.1%. Thus, preferred rotors improve hover efficiency while maintaining or improving axial forward flight performance. Preferred aircraft have maximum hover disc loadings between 10 pounds per square foot and 30 pounds per square foot (psf), or more preferably between 15 and 25 psf. The maximum hover disc loading is the maximum hover takeoff weight divided by the rotor area.

The high cruise speed of the AeroTrain is important both for aircraft passenger transport productivity goals in terms of passenger miles per day and for the important goal of reduced door-to-door travel time. To achieve these goals, shaping the inboard blade planform to increase chord while reducing thickness ratio is contemplated. In preferred embodiments, this rotor blade thinning is combined with judicious design and improvement of blade root airfoils, and an area-ruled nacelle and hub fairing. Some preferred blade root airfoil sections have a thickness ratio of only 22.5%. Achieving a thickness ratio of 22.5% at the blade root while ensuring that the desired structural dynamic characteristics are achieved, such that the first blade flap and lag frequencies are greater than the 3/rev at the maximum hover rpm, requires special blade composite construction methods. In general, all suitable blade construction methods are contemplated including those described in U.S. patent application Ser. No. 12/200,534. Especially preferred rotors are hingeless rotors, capable of transferring bending moments of at least 20,000 foot-pounds from the rotor to the airframe.

Preferred rotor blade airfoils are designed balancing the requirements of hover and high-speed axial cruise flight. Preferred root airfoils in the presence of a nacelle and hub fairing are capable of operating in their airfoil drag bucket at vehicle cruise speeds of Mach 0.65, 0.66, or even 0.70. One especially preferred root section airfoil with a thickness ratio of 22.5% can achieve a drag coefficient of only 0.025 at a high Mach cruise condition.

The AeroTrain tiltrotor is also advantageously configured to include a preferred rotor spinner fairing with shaping to improve rotor function at high tiltrotor cruise Mach numbers. Conventionally a spinner creates blockage for the inboard blade sections, further raising the local flow Mach number. Computational fluid dynamics simulation results around the blade roots, spinner, and wing at Mach 0.65 demonstrates elevated sectional Mach numbers at inboard sections. In preferred embodiments, a dramatically area-ruled spinner is contemplated that can lower the Mach numbers by 0.01-0.03 at rotor blade sections inboard of 25% of span, substantially increasing the envelope for efficient cruise. In an especially preferred embodiment, shaping the tilt-rotor spinner by restricting a minimum diameter by 5% or more of a maximum diameter is calculated to increase the efficient cruise Mach number of the rotor 0.01-0.03. Alternate preferred embodiments take advantage of the locally slowed flow and use very thick root sections, with thickness ratios of 28%, rapidly tapering to thinner sections at greater spanwise stations. Where a definition or use of a term in an incorporated reference is inconsistent or contrary to the definition Where a definition or use of a term in an incorporated reference is inconsistent or contrary to the definition It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A rotorcraft comprising:
    a fixed wing of sufficient size to allow wing-borne flight;
    the wing carrying a first rotor on a first side of the rotorcraft and a second rotor on an opposite side of the aircraft;
    the rotors configured to tilt from a predominately horizontal position to a predominantly vertical position; and
    the first rotor with a first blade having a stacking line, with the first blade having a shaped tip portion with a terminal anhedral of at least 33° and a terminal sweep of at least 20° with respect to the stacking line, wherein the rotor is oriented for edgewise flow with an advance ratio of at least 0.05 during at least a portion of a flight.

2. The rotorcraft of claim 1 wherein the first blade has a terminal anhedral of at least 40° with respect to the stacking line.

3. The rotorcraft of claim 1 wherein the first blade has an overall twist from root to tip of at least 20°.

4. The rotorcraft of claim 1 wherein each of first and second rotors is a hingeless rotor.

5. The rotorcraft of claim 1 wherein the first blade has a thickness to chord ratio between 19% and 30% at a radial station of 10% of a blade radius, and wherein the rotor is oriented for axial flow with a sectional Mach number of at least 0.55 during at least a portion of a flight.

6. The rotorcraft of claim 1 wherein at an edgewise advance ratio of 0.35, each of first and second rotors has a power consumption at least 5% greater than a corresponding rotors without the shaped tip portion.

* * * * *